Patented Apr. 22, 1952

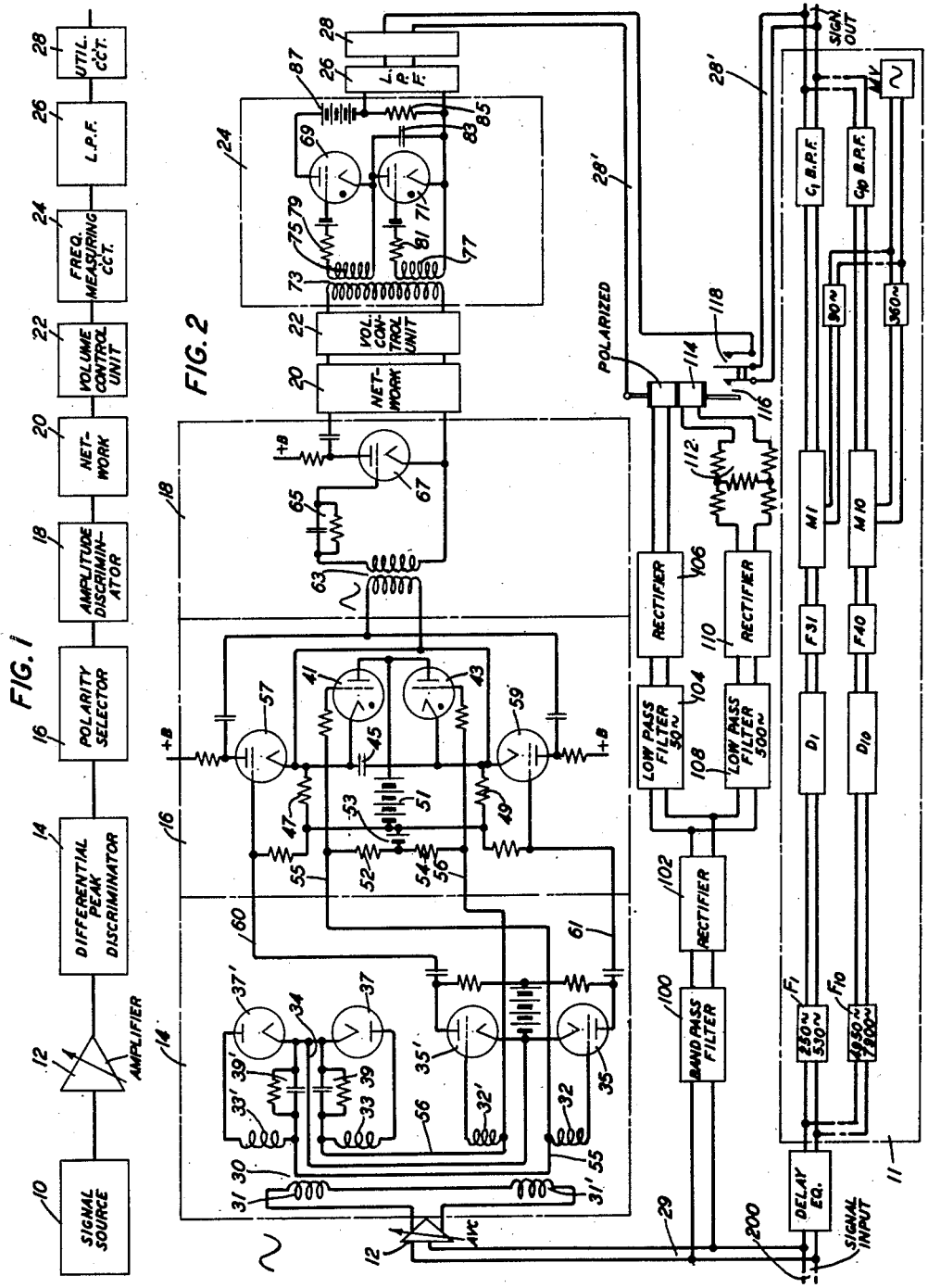

2,593,694

UNITED STATES PATENT OFFICE 2,593,694

WAVE ANALYZER FOR DETERMINING FUNDAMENTAL FREQUENCY OF A COMPLEX WAVE

Eugene Peterson, New York, N. Y., assignor to Bell Telephone Laboratories, Incorporated, New York, N. Y., a corporation of New York Application March 26, 1948, Serial No. 17,204

4 Claims. (Cl. 175—183)

This invention relates to signaling systems and more particularly to such systems in which complex waves are analyzed.

It is an object of the invention to make possible the determination of the frequency of the fundamental component of a complex wave.

It is also an object of the invention to improve the method and means for transmitting signal intelligence with reduced frequency range from a point where the signal wave is analyzed to a point where it is reconstructed.

Systems of this reduced frequency range type are disclosed in H. W. Dudley United States Patents 2,151,091, issued March 21, 1939, and 2,243,527, issued May 27, 1941. In these systems the input signal wave is analyzed to determine its voiced or unvoiced character, its fundamental frequency, and its amplitude distribution. This information is then transmitted to the receiving point where it controls the operation of the synthesizing apparatus in reconstructing the message intelligence. Although the two patented systems differ to a considerable degree in their various features, it is necessary that a determination of the fundamental frequency of the signal wave be made in each instance. In the case of speech signal waves, the result of this analysis indicates whether the signal was a voiced, or an unvoiced sound, and, if it was a voiced sound, there is derived an indication of the frequency of its fundamental component. It is with regard to the derivation of this frequency indication that the present invention, in one of its embodiments, effects an improvement in such transmission systems.

In the above-referred to systems, the frequency indication of this fundamental component is secured by selecting from the signal wave a band of frequencies which may include the fundamental component, and a few of the lower harmonics thereof. These are combined in a suitable detector circuit to secure a product that contains a component having a frequency that is equal to the difference frequency between adjacent harmonic components, and which is numerically equal to the frequency of the fundamental component. This difference frequency is then selected by passing the product through an equalizer, the attenuation characteristic of which increases with frequency. In this manner the fundamental component acquires a relatively high power level, compared to any upper harmonics that may be present. This derived frequency component may then be utilized in any suitable manner since it represents the desired fundamental component. It is apparent that the extraction of this information is facilitated by the presence in the analyzed wave of the fundamental component. If the fundamental is not present, then several of its lower order harmonic components are required, since it is in these components that the major portion of the signal power resides. It is also evident that fixed phase relations between the adjacent components is highly desirable, since the desired output product consists of a strong difference frequency component. If this relation is not fixed, one or more components may temporarily assume such proportions, relative to adjacent components, that heterodyning takes place between non-adjacent components, and thus give rise to spurious pitch changes of an octave. When these combined conditions arise in the wave to be analyzed, the derivation of an accurate fundamental frequency indication may become exceedingly difficult.

It is accordingly an object of the present invention to make possible the derivation of this frequency information by a new and improved means and method.

It is one feature of the invention that the complex wave is analyzed by reference to its wave form, as distinguished from dividing it into its frequency components.

It is another feature of the invention that this analysis is not dependent upon the presence or absence of the fundamental component.

It is a still further feature of the invention that a substantially correct frequency determination may be made, notwithstanding that the adjacently related harmonic components are not in fixed phase relations.

The invention is also characterized in that it makes use of the asymmetry of a speech signal wave as it is derived from an electroacoustic transducer.

Other desirable aspects of the invention will become apparent from the following description of one of its preferred embodiments, when considered in conjunction with the accompanying drawing in which:

Fig. 1 shows in block schematic form an embodiment of the invention; and

Fig. 2 is a combined block and detailed schematic diagram of the embodiment of Fig. 1 when incorporated in the transmitting equipment of one form of a speech analyzing and synthesizing system.

In deriving an indication of the frequency of the fundamental component of a complex signal wave, the present invention makes use of some more or less well-known characteristics of the wave, which are believed not to have been previously employed for this purpose. The first of these relates to the periodicity of such a wave. When considered from a purely mathematical viewpoint, a voiced speech signal wave is not a true periodic wave, since it does not repeat itself from plus to minus infinity. However, the wave does repeat itself during the period of a syllable, which period may for convenience be referred to as a syllabic interval. These intervals do not occur at a rate in excess of seven or eight times a second in ordinary conversational speech waves. Because of this characteristic, the wave may be said to be quasi-periodic, since it does repeat itself for several cycles during each syllabic interval. In such a periodic complex wave, the wave components combine in such relation that they produce a series of recurring cycles that are spaced apart an interval that corresponds to the wave's fundamental frequency. In the practice of this invention, the quasi-periodic character of the speech signal is employed in reconstructing the fundamental component, or in securing an indication of its character.

The second of the employed characteristics has to do with the symmetry of the wave form. It is known that in some signal waves, and particularly in speech signals, the amplitude of the positive and negative peaks may not be equal. This inequality, which may in some cases assume proportions of two to one, was referred to by Holbrook and Dixon in The Bell System Technical Journal, vol. 18 (1939), 624, 630. Although the inequality is a stable factor, it may not remain in a single direction, since it is affected by varying physical factors, such as substitution of microphones, distance of source from the microphone, and changes in the lower frequency components of the signal wave.

In accordance with the invention, it is proposed to determine the frequency of the wave's fundamental component by selecting the peak of maximum amplitude in each series of recurring peaks, corresponding to one cycle of the envelope of the wave, and measuring the periods between the peaks of successive cycles. To facilitate this determination, the natural asymmetry of the signal wave may be enhanced, or enlarged, to accentuate the peak that is maximum. Also, the wave polarity in which this enhanced maximum peak occurs may be selected by detecting the degree of asymmetry between the positive and negative wave portions. Although the enhancement of the wave asymmetry and the selecting as between polarities of the wave will, in certain cases, facilitate the desired determination, these operations are not indispensable in practicing the invention.

From the foregoing brief description it is apparent that several operational stages may be involved before a suitable frequency determination is successfully achieved. One method by which this may be accomplished is indicated by the block schematic diagram of Fig. 1, in which speech signals are shown as originating at source 10. The signal wave is impressed on an amplifier 12, in which conventional automatic volume control insures the delivery of a stable usable signal level to a differential peak discriminator 14. In the latter, the signal wave is split into two wave portions of diverse polarity, each of which is detected and amplified in such relation that the biasing voltage for each wave polarity is obtained from the wave polarity in conjugate relation. By this cross-biasing action, the larger of the asymmetrical peaks is relatively enlarged, and the smaller of these peaks is relatively further shrunken. The waves portions are then simultaneously transmitted to a polarity selector 16 where the wave polarity containing the peak of maximum amplitude is selected or segregated for further analysis. In an amplitude discriminator 18 this selected or segregated portion of the wave is utilized or detected in a peak rectifying circuit, the negative bias of which is set at such a level that only the maximum peaks of the signal wave cause increased anode-cathode current flow. This detection process produces an output wave that contains a short sharp pulse of energy coincident in time relation with the peak of maximum amplitude in each recurrent series of peaks or cycle of the segregated wave portion. The negative control grid bias of the discriminator is such that it rejects substantially all peaks except the peak of greatest amplitude in each envelope cycle. In infrequent cases, a cycle of the envelope wave may contain two peaks that are of sufficient magnitude and of suitable separation such that both are detected, and two pulses, instead of the usual one, are derived. This is similar in its effect to detecting the second harmonic of the fundamental component, and the undesirable effects are eliminated in a network 20 where suitable corrective measures are applied. The network 20 may be either a wave filter having a suitable pass band, or it may be a frequency sensitive network, in which the attenuation increases with frequency. If it is a filter of the band pass type, it might best be restricted to a band of frequencies corresponding to about one octave variation in the pitch, in order that its output wave will be restricted to the fundamental component. In such an event the fundamental component may be utilized in any suitable manner. If a pitch variation greater than one octave is desired, the amplitude discriminating, or equalizer type of network provides a satisfactory solution. This equalizer may have any suitable configuration, with its transmission loss increasing with frequency, such that the fundamental frequency, which may vary from about 80 to some 300 cycles per second, comes out with a relatively high power level as compared to any of its harmonic components that may be present. The output of the network 20 is transmitted to a volume control unit 22 which may be any suitable voice frequency amplifier that has sufficient gain to restore the energy level of the fundamental component to a level sufficient for satisfactory operation of a frequency measuring circuit 24. This latter circuit may take the form of a gas tube frequency indicating circuit such as is shown in Fig. 2 of R. R. Riesz Patent 2,183,248, dated December 12, 1939; or if desired, a suitable arrangement such as a controlled multivibrator oscillator may be used. In either event, there is produced at the output of a low-pass filter 26, a unidirectional voltage the amplitude of which is directly proportional to the frequency of the fundamental component. This proportional voltage may be employed in utilization circuit 28 to produce a frequency indicating signal that possesses characteristics suitable for the intended usage.

The manner in which the disclosed embodiment of the invention operates may be best understood by considering the detailed arrangement of Fig. 2, in which the apparatus indicated within the dotted line rectangle 11 constitutes the channel equipment for deriving the amplitude pattern control currents of a signal transmission system such as is described in H. W. Dudley Patent 2,151,091, March 21, 1939. Reference may be made to this Dudley patent for a description of such apparatus and its method of operation. The signal wave is derived from the signal input circuit 200 by way of the tapped connection of circuit 29; through which it is applied to the input of the differential peak discriminator 14 after being amplified in the automatic volume control amplifier 12. The circuit branch connected to band-pass filter 100 is an enabling circuit for distinguishing between voiced sounds on the one hand, and unvoiced or mixed sounds on the other, and insures that the pitch determining branch will be disconnected from the system in the absence of voiced sounds. Filter 100 may have a pass band from 3,000 to 5,000 cycles per second, or some similar relatively high frequency range. Signal wave frequencies passed through this filter are rectified in rectifier 102 to bring out a large number of difference frequencies, which will be in a harmonic relation if the signal wave is a periodic, or quasi-periodic one. If however, the signal is of the unvoiced type, or is composed of mixed voiced and unvoiced characteristics, there will be a more or less continuous spectrum of energy with a likelihood that the random energy distribution will be greater than the discrete energy distribution, since the random distribution is more or less irrespective of frequency, whereas the discrete type rapidly decreases as the frequency range increases. The rectified energy is next applied to the low-pass filters 104, 108. The 50-cycle low-pass filter 104 will pass energy from an unvoiced, or mixed type sound, but will not pass energy from a voiced type sound since the lowest difference frequency for this type will be in the neighborhood of 80 cycles per second. Similarly, the 500-cycle low-pass filter 108 will pass energy originating from either type of sound, and will include the discrete type of energy, if such is present. For the unvoiced, or mixed type of sound there should be about a 10 decibels greater output from filter 108 than from filter 104. The outputs of these filters are then applied to respective rectifiers 106, 110, and then in differential connection to the biased polarized relay 114. Attenuating pad 112 compensates for the previously mentioned difference in output of the two filter channels. Relay 114 remains unoperated for the unvoiced and mixed type of sounds but is operated by the voiced type of sounds. Thus voiced sounds result in "making" the contacts 116 and 118 in the output circuit 28', to connect the pitch control or frequency analyzing apparatus into the signaling system.

The discriminator input transformer 30 includes primary windings 31, 31' and two pairs of secondary windings 32, 32' and 33, 33'. Windings 32, 32' are separately connected to the two amplifying branches of the peak discriminator 14, which include the triode elements or vacuum tubes 35, 35'. Windings 32, 32' are so poled that instantaneous voltages of opposite polarity appear at the respective control grids of the tubes 35, 35'. Windings 33, 33' are similarly connected to the bias-deriving section of the peak discriminator, which section includes the two electrode vacuum tubes or diodes 37, 37'. Windings 33, 33' are interconnected with the windings 32, 32' in such a manner that windings 32, 33' form one combined secondary winding, and windings 32', 33 form a second combined secondary winding. Each of the combined secondary windings is connected to the anode of a separate bias-producing diode 37, 37' at one of its extremities, and to the control electrode of a separate amplifying triode element 35, 35' at its opposite end. The cathode of each diode 37, 37' is connected through a resistor-capacitor load network 39, 39' to the mid-point of its respective combined secondary winding in such manner that the mid-point of the combined winding assumes a negative potential with respect to the cathode as the associated diode element conducts current. These load networks 39, 39' should be substantially identical, and may, for example comprise elements having a time constant of about .01 second. The time constant of this network may vary between rather wide limits, the cited value of .01 second being merely one of several suitable values. It will be noted that the connections to the secondary windings are such that, as the anode of one diode assumes an induced potential of one polarity, the control electrode of its associated triode simultaneously assumes a corresponding induced potential of the opposite polarity. As a consequence, the control electrode of each triode 35, 35' acquires a control bias from a signal wave that is of opposite polarity to the polarity of the wave it amplifies. In this manner, any asymmetry between the positive and negative portions of the signal wave is increased.

In addition to providing a difference enhancing bias voltage for the amplifiers 35, 35', the voltages developed across the load networks 39, 39' also control the operation of the polarity selector 16, in which the wave polarity that contains the largest peaks is selected or segregated for further analysis. When a symmetrical wave is applied to the input of the discriminator 14, the mid-point of each combined secondary winding acquires the same negative potential with reference to the common cathode connection 34. However, when an asymmetrical wave is supplied to the discriminator input, one of the diodes 37, 37' will conduct during a greater portion of its cycle than will the other. As a consequence, the mid-points of the combined windings will acquire unequal negative potentials referred to this common reference connection 34. Interconnecting circuits 55, 56 connect the mid-point of each combined secondary winding to the appropriate control electrode of one of a pair of gas-filled tubes 41, 43 in the polarity selector 16 where these unequal potentials are used to control the switching action of this circuit in a manner to be presently described.

As with the peak discriminator 14, the selector 16 comprises two separate sections, each of which includes two branches. One section, comprising the pair of gas-filled tubes 41, 43 together with capacitor 45 and resistors 47, 49, performs a commutating or switching function. The other section comprises the triode elements, or vacuum tubes 57, 59, and operates as a selective amplifier for amplifying one or the other of the oppositely poled signal waves which are received from the differential peak discriminator 14 over the interconnecting circuits 60, 61. This amplifying section is so controlled by the switching section of the selector, that only one of the amplifying triodes 57, 59 is conductive at any one interval. In turn, the switching section, comprising the tubes 41, 43, is controlled by the bias produced across the load networks 39, 39' of the discriminator 14 in such manner that only that wave polarity containing the peaks of greatest amplitude is passed by the selector 16 to the amplitude discriminator 18.

The manner in which the selector 16 operates may be described as follows: Consider first its switching section comprising the tubes 41, 43, the capacitor 45 and the resistors 47, 49. Potential source 51 supplies anode voltage for the tubes 41, 43. Control electrode voltages for these tubes are produced by combining across resistors 52, 54 the negative potentials derived from the load networks 39, 39' of the discriminator 14, as received over interconnecting circuits 55, 56, and adding thereto the negatively poled potential from source 53. As was previously described, equal negative potentials are produced across load networks 39, 39' when a symmetrical wave is supplied to the input of the discriminator 14. The potential of source 53 is so adjusted that when it is added with these combined equal negative potentials, each of the tubes 41, 43 is held just below its operating condition. When unequal negative potentials, produced by an asymmetrical input to discriminator 14, are combined across resistors 52, 54, the potential of the control electrode of one gas tube 41, 43 is raised to a level sufficient to initiate current conduction in the anode-cathode circuit of that tube. Resistor 47 is common to the anode-cathode circuits of tube 41 and the triode 57. This resistor is also included in the control grid-cathode circuit of triode 57 in such manner that, as tube 41 conducts current, a voltage generated across this resistor 47 biases the triode 57 beyond its cut-off potential. In similar manner, the resistor 49 is included in the circuits of the tube 43 and triode 59. From this it will be seen that only one triode amplifier 57, 59 of the polarity selector 16 may be conductive at a given instant, since one or the other of tubes 41, 43 is in a conductive condition at all times. If it be assumed that the tube 41 is conducting at any given instant, then the capacitor 45 will have charged to a voltage equivalent to the potential of source 51, minus the internal drop of the tube 41, with the capacitor plate that is connected to the cathode of tube 41 having acquired the higher potential. In this condition, the voltage generated across resistor 47 will have biased the triode 57 beyond its cut-off potential. Conversely, no current will be flowing through resistor 49, no voltage will be generated across resistor 49, and the triode 59 will be in its conductive state. If it be assumed that the asymmetry of the signal wave supplied to the discriminator 14 changes such that the potential difference across resistors 52, 54 is reversed, the potential of the control electrode of tube 43 is raised, and this tube becomes conductive. The voltage generated across resistor 49 equalizes the potential difference across the capacitor 45. This equalization process momentarily raises the cathode of tube 41 to a value exceeding its plate voltage, extinguishes conduction in that tube, and permits its control electrode to regain control and hold it non-conductive. Simultaneously with this reversal of conduction in the tubes 41, 43, the triode 57 becomes conductive, and triode 59 is rendered non-conductive. Since the reversal of the asymmetry of the input signal wave resulted in shifting the enlarged, or enhanced, maximum peaks from one to the other of the interconnecting circuits 60, 61, it will be seen that the switching of the polarity selector 16 follows this changed condition. The foregoing conditions maintain until the asymmetry of the signal wave is again reversed, at which time the switching operation is repeated in the reversed direction.

The selected or segregated signal wave is impressed upon the amplitude discriminator 18 through its input transformer 63. The discriminator is essentially a grid-leak detector in which the time constant of the resistor-capacitor network 65, may, for example, be of the order of .01 second. The reactance of the capacitive element should be small compared to the load resistance at the signal frequencies, and should be relatively much larger at frequencies corresponding to the period between peaks. This capacitor charges to a voltage value that is equal to the product of the load resistance and the average current through the resistor element. Although this voltage value is not absolutely constant during the cycles of the speech wave components, for practical purposes the time constant of .01 second is sufficiently long that it may be regarded as being a steady state value that changes only as the average signal current changes. By properly correlating the constants of the network 65 and the amplitude of the signal wave impressed on transformer 63, the voltage value across the condenser may be caused to assume such a negative bias with respect to the cathode of the three-electrode vacuum tube 67 that the plate-cathode current therein assumes a minimum value for all values of the impressed signal wave, except the enhanced peak of maximum amplitude. This results in a unidirectional voltage output wave that has "spikes," or periods of abrupt voltage changes, at intervals corresponding to these detected maximum peaks in the signal wave. For voiced sounds, the interval between successive voltage changes corresponds to the period of the fundamental component of the sound. For unvoiced sounds, this interval will probably correspond to the time-constant of grid-leak network 65. In this latter case, this rectified output does not convey false pitch information since the enabling relay 114 is in its unoperated position. This output wave may be transmitted through the network 20 which, as was previously stated, may be a filter having a pass band of about one octave, or an equalizer in which the transmission loss increases linearly with frequency at any desired rate suitable to insure that the lowest frequency alternating component of the wave comes out at a high power level compared to the upper harmonics of that component. The level of this wave component, as secured from network 20, may be restored in the volume control unit 22, which may be any suitable constant output level amplifier similar to unit 12.

An indication of the frequency of this wave component may be obtained from the frequency measuring circuit 24, in which the tubes 69 and 71 are of the gas-filled type, the control grids of which are so biased that both tubes are non-conductive if no input signal is applied. Input transformer 73 has a pair of oppositely poled secondary windings 75, 77 such that when a signal wave is impressed on its primary winding, signals of opposite polarity are impressed on the control grids of the tubes 69, 71. When the impressed signal carries the control grid of tube 69 sufficiently positive, that tube conducts, and capacitor 83 is charged through the circuit comprising the resistor 85, the plate supply source or battery 87 and the anode-cathode path of tube 69. When the capacitor 83 acquires sufficient charge, the cathode of tube 69 is carried positive to a degree sufficient to extinguish conduction in that tube.

It cannot again become conducting until the potential across the capacitor 83 has been reduced. This reduction will occur when the signal induced in winding 77 causes the control grid-cathode potential of tube 71 to become sufficiently positive to initiate conduction therein, and thereby discharge capacitor 83 through the anode-cathode circuit of this tube. This cycle of operation will be repeated once during each cycle of the impressed wave component of the signal wave. Once during each cycle of the impressed wave component, a saw-tooth shaped voltage pulse is generated across resistor 85 while tube 69 is conducting current. These generated pulses are smoothed, or averaged, in the low-pass filter 26, which may have a cut-off frequency of about 30 cycles per second. The average value of these pulses during any interval will depend upon the frequency of the wave component during that interval, since all pulses so generated have the same shape and height. This average value is therefore representative of the frequency of the fundamental component of the impressed voiced speech signal. To facilitate its transmission, this frequency indicating voltage may be used to control the frequency of a suitable low frequency oscillator 28. If the original impressed signal wave was derived from a voiced type of sound, relay 114 will be in its operated condition, and the output of oscillator 28 will be connected to the signal output circuit through the operated contacts 116, 118 and connecting circuit 28'.

Although the invention has been described as being embodied in a specified structure adapted for use in a speech analyzing and synthesizing system it should be evident that its utility is not so limited. The invention may be broadly applicable wherever the frequency of the fundamental component of a periodic or quasi-periodic complex wave is to be determined, notwithstanding the actual presence or absence of this component in the wave. Similarly, although the foregoing description has explained the invention in an embodiment that employs a designated number and type of differential peak discriminator and polarity selector, it should also be appreciated that the same or other forms of these circuit elements may be employed in similar physical arrangements in which a greater or lesser number of these units may be combined with one or more amplitude discriminators and other described units to effect the objects of this invention. Therefore, other useful applications that do not depart from the spirit and scope of the invention will readily occur to those skilled in the related art.

What is claimed is:

1. The method of operating on an asymmetric quasiperiodic complex wave including a plurality of wave components in integral harmonic relation to a fundamental component which may be missing from the complex wave at all frequencies below a designated minimum value, comprising dividing the complex wave into two conjugate portions of opposite instantaneous polarities, enlarging the magnitude of the components of each of the divided portions in accordance with the magnitude of the components of the conjugate portions, segregating the wave portion that contains the components of greater magnitude, selecting the peak of maximum amplitude in each cycle of the segregated portion, creating a train of voltage impulses successive ones of which correspond in time to successive ones of said selected peaks, and deriving from said created impulses a voltage indication proportional to the interval between successive impulses and to the frequency of said fundamental component.

2. In a system for determining the frequency of the fundamental component of a complex wave having periodic characteristics and which includes a plurality of wave components of frequencies that are in integral harmonic relation to the frequency of the fundamental component, the combination which comprises means for dividing said complex wave into two portions having oppositely related instantaneous characteristics, amplifying means for increasing the magnitude of the combined wave components of each portion in accordance with the magnitude of the combined components of the other of said two portions, amplitude sensitive means responsive to said derived wave portions for segregating the wave portion which contains the increased components of greatest magnitude, means for transmitting only the maximum component peak in each cycle of said segregated portion, and frequency sensitive means responsive to said transmitted peaks for producing a periodic quantity having an average value of zero over a period equal to the interval between successive ones of said transmitted peaks, said period and said interval each being equal to the reciprocal of the frequency of said fundamental component.

3. In a signal wave synthesizing system, means for producing and indication of the pitch of a speech signal wave which wave may not include the fundamental component but which does include a plurality of wave components in integral harmonic frequency position with respect to the frequency of said fundamental component, said means comprising means for dividing said signal wave into at least two wave portions the instantaneous values of which are in displaced phase relation, means for detecting asymmetry in the wave forms of said portions, means responsive to said detected asymmetry for dissimilarly increasing the magnitude of said asymmetrical portions, means for segregating the one of said portions that contains the wave components of greatest amplitude, means for extracting the peak of greatest amplitude in each series of successively recurring peaks of said segregated portion, and means responsive to said extracted peaks for producing an electrical quantity the characteristics of which are indicative of the frequency of the fundamental wave component and the pitch of said signal wave.

4. In a signal wave synthesizing system, means for producing an indication of the pitch of a speech signal which comprises means for dividing said wave into two portions of opposed instantaneous polarities, means for detecting the asymmetry between the positive and negative portions of said signal, means responsive to said detected asymmetry for further increasing the magnitude of the wave asymmetry, means responsive to said detected asymmetry for segregating that asymmetrical wave portion that contains the combined wave component having the greatest amplitude excursions, means for extracting from each cycle of the segregated portion the component peak of maximum amplitude, an electrical network the frequency characteristic of which offers minimum attenuation to the energy components of said extracted peaks that correspond to the interval between successive peaks, and pulse producing means connected to said network and which, in response to said minimally-attenuated energy component, produces a series of unidirectional voltage impulses, the average value of which, during any period, is indicative of the frequency of the fundamental component of said original signal wave during said period.

EUGENE PETERSON.

REFERENCES CITED

The following references are of record in the file of this patent:

UNITED STATES PATENTS

| Number | Name | Date |
| --- | --- | --- |
| 1,994,232 | Schuck, Jr. | Mar. 12, 1935 |
| 2,151,091 | Dudley | Mar. 21, 1939 |
| 2,176,742 | La Pierre | Oct. 17, 1939 |
| 2,183,248 | Riesz | Dec. 12, 1939 |
| 2,243,527 | Dudley | May 27, 1941 |
| 2,396,072 | Babcock et al. | Mar. 5, 1946 |
| 2,428,021 | Grieg | Sept. 30, 1947 |
| 2,443,603 | Crost | June 22, 1948 |